United States Patent
Tang

(10) Patent No.: US 7,448,776 B2
(45) Date of Patent: Nov. 11, 2008

(54) BRIGHTNESS ENHANCEMENT FILM HAVING CURVED PRISM UNITS

(75) Inventor: Shih-Chieh Tang, Tainan (TW)

(73) Assignee: Efun Technology Co., Ltd., Tainan (TW)

( * ) Notice: Subject to any disclaimer, the term of this patent is extended or adjusted under 35 U.S.C. 154(b) by 0 days.

(21) Appl. No.: 10/882,346

(22) Filed: Jul. 2, 2004

(65) Prior Publication Data
US 2005/0237641 A1  Oct. 27, 2005

(30) Foreign Application Priority Data
Apr. 22, 2004 (TW) .............................. 93206216 U

(51) Int. Cl.
*F21V 5/02* (2006.01)
(52) U.S. Cl. ................ 362/339; 362/337; 362/620
(58) Field of Classification Search ............... 359/831, 359/599; 362/337, 339, 620
See application file for complete search history.

(56) References Cited

U.S. PATENT DOCUMENTS

| | | | |
|---|---|---|---|
| 5,919,551 A * | 7/1999 | Cobb et al. ................ 428/156 |
| 6,277,471 B1 | 8/2001 | Tang ........................... 428/172 |
| 6,354,709 B1 * | 3/2002 | Campbell et al. ............. 362/31 |
| 6,862,141 B2 * | 3/2005 | Olczak ........................ 359/621 |
| 2001/0053075 A1 * | 12/2001 | Parker et al. ................. 362/31 |
| 2003/0034445 A1 * | 2/2003 | Boyd et al. ............ 250/227.11 |
| 2003/0035231 A1 * | 2/2003 | Epstein et al. .............. 359/834 |

FOREIGN PATENT DOCUMENTS

WO    WO 96/23649    8/1996

* cited by examiner

Primary Examiner—Alessandro Amari
Assistant Examiner—Mark Consilvio
(74) Attorney, Agent, or Firm—Bacon & Thomas, PLLC

(57) ABSTRACT

A brightness enhancement film includes a substrate and a plurality of curved prism units. The curved prism units are extended in parallel and mounted to a surface of the substrate. Each of the curved prism units includes at least one meandering surface to provide with changes in curvature. Thus, the meandering surface of the curved prism unit is able to refract incident light in two dimensions with respect to the substrate that may enhance entire refractive efficiency in two dimensions.

18 Claims, 6 Drawing Sheets

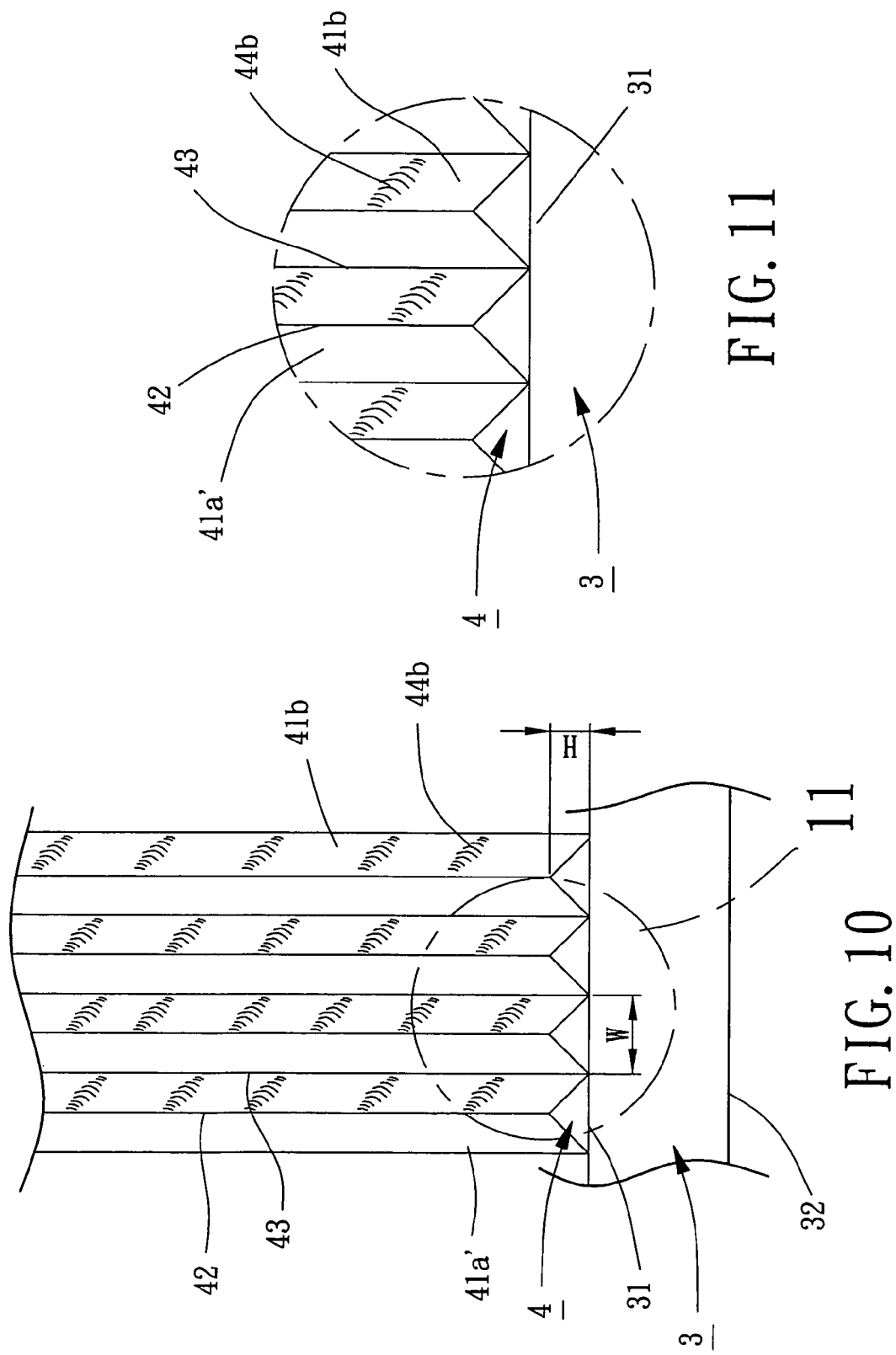

BRIGHTNESS ENHANCEMENT FILM HAVING CURVED PRISM UNITS

BACKGROUND OF THE INVENTION

1. Field of the Invention

The present invention relates to a brightness enhancement film having curved prism units. More particularly, the present invention relates to a brightness enhancement film having curved prism units each of which is extended in a meandering line to provide changes in curvature. The brightness enhancement film is applied to a Liquid Crystal Display that improves the entire optical refractive characteristic.

2. Description of the Related Art

Referring to FIG. 1, International Patent Publication No. WO 96/23649 discloses a brightness enhancement film including a base 1 and a plurality of prisms 2 juxtaposed in order on the base 1. Each of the prisms 2 consisted of a first flat facet 2a and a second flat facet 2b adapted to refract light to condense light.

However, the first flat facet 2a and the second flat facet 2b are flat surfaces different from curved surfaces and thus only able to refract light in one dimension with respect to a top horizontal surface of the brightness enhancement film. Namely, the brightness enhancement film is only able to condense light in one dimension as well as one-dimensional refraction.

Referring to FIGS. 2 and 3, U.S. Pat. No. 6,277,471, issued on Aug. 21, 2001 to Tang, discloses an another brightness enhancement film including a base 11 and a brightness layer 12. The base 11 has a top surface and a bottom surface. Also, the brightness layer 12 has a top surface and a bottom surface. A plurality of rippled ridges 121 are juxtaposed in order and each of which consists of brightness units 122 arranged in order. Each of the brightness units 122 consists of a pair of curved surfaces 123 and 214 which may refract light in two dimensions so that the brightness unit 122 is able to condense light in two dimensions. Structurally, the bottom surface of the brightness layer 12 is connected to the top surface of the base 11 to form the construction of the brightness enhancement film.

Referring again to FIGS. 1 and 2, U.S. Pat. No. 6,277,471 achieves condensing light in two dimensions by replacing the flat facets 2a and 2b of the prisms 2 disclosed in WO 96/23649 with the curved surfaces of brightness units 122. Therefore, U.S. Pat. No. 6,277,471 improves drawback of WO 96/23649 that merely condenses light in one dimension.

Referring again to FIG. 3, the brightness unit 122 consists of a first curved surface 123 and a second curved surface 124 whose curvature is able to refract light in two dimensions to accomplish the condensing function. The first curved surface 123 and the second curved surface 124 slope gently toward the top surface of the brightness layer 12 so that bottom edges of the first curved surface 123 and the second curved surface 124 are commonly terminated at a straight bottom edge 125. The straight bottom edge 125 is located between the two adjacent brightness units 122 and the straight bottom edges 125 are serially connected to each other to form a wave trough.

Generally, the curvature of the first curved surface 123 and the second curved surface 124 are able to refract light for condensing. However, the first curved surface 123 and the second curved surface 124 are sloped gently toward the straight bottom edge 125, and thus the surface adjacent to the straight bottom edge 125 is nearly a horizontally flat surface. The slight curvature of the flat surface is inadequate to refract light in two dimensions. Although the first curved surface 123 and the second curved surface 124 are able to refract light in two dimensions, the surface adjacent to the straight bottom edge 125 may reduce the entire refractive efficiency for the brightness unit 122 and cause a moire phenomenon.

Additionally, the structure of the brightness unit 122 is complicated and increases the manufacture cost of a mold assembly.

The present invention intends to provide a brightness enhancement film having curved prism units. Each of the curved prism units extends in a meandering line so that at least one surface of the curved prism unit provides changes in curvature, i.e., such that a direction of said meandering surface relative to said longitudinal direction varies along a length of each of said prism units. Thereby, the changes of the curved prism unit in curvature refract light in two dimensions to attenuate the moire phenomenon and the structure of the curved prism units is simplified in such a way as to mitigate and overcome the above problem.

SUMMARY OF THE INVENTION

The primary objective of this invention is to provide a brightness enhancement film having curved prism units each comprising at least one surface extending in a meandering line so as to provide changes in curvature to refract light in two dimensions. Thereby, the curved prism units extending in a meandering line may enhance the entire refractive efficiency in two dimensions.

The secondary objective of this invention is to provide a brightness enhancement film having curved prism units, which are arranged to longitudinally extend in haphazard order so as to attenuate the moire phenomenon.

The brightness enhancement film in accordance with the present invention comprises a substrate and a plurality of curved prism units. The curved prism units are extended in parallel and formed on a surface of the substrate. Each of the curved prism units includes at least one meandering surface to provide with changes in curvature. Thus, the meandering surface of the curved prism unit is able to refract incident light in two dimensions with respect to the substrate that may enhance entire refractive efficiency in two dimensions.

The substrate and the curved prism units of the brightness enhancement film in accordance with the present invention form a single film, and are made of identical transparent material. Alternatively, the substrate and the curved prism units are made of dissimilar transparent material, and adhered to each other. Thereby, the brightness enhancement film may widen the scope of application and manufacture.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein:

FIG. 10 is a perspective view of a brightness enhancement film having curved prism units in accordance with a fourth embodiment of the present invention; and FIG. 11 is an enlarged view in FIG. 10 of the curved prism units of the brightness enhancement film in accordance with the fourth embodiment of the present invention.

DETAILED DESCRIPTION OF THE INVENTION

Figures 4, 5:
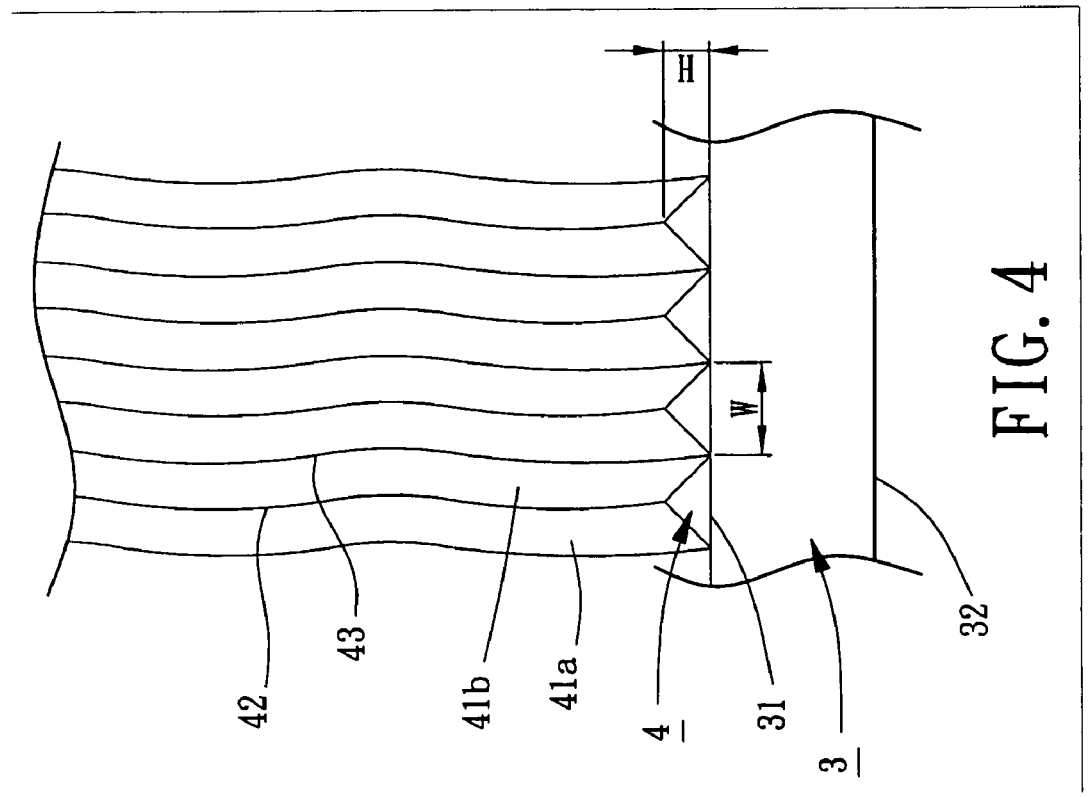
FIG. 4 is a perspective view of a brightness enhancement film having curved prism units in accordance with a first embodiment of the present invention.
FIG. 5 is an electronic microscopic image of the curved prism units of the brightness enhancement film in accordance with the first embodiment of the present invention.

Referring initially to FIG. 4, a brightness enhancement film in accordance with the present invention includes a substrate 3 and a plurality of curved prism units 4 which are made of an identical transparent material to thereby constitute a single film. The substrate 3 includes a first surface 31 and a second surface 32 substantially parallel thereto and thus light is able to penetrate the substrate 3 therebetween. The curved prism units 4 constitute a microstructure layer, and are selectively juxtaposed on either of the first surface 31 or the second surface 32 of the substrate 3. Structurally, each of the curved prism units 4 essentially consists of a first meandering surface 41a and a second meandering surface 41b. The first meandering surface 41a and the second meandering surface 41b of the curved prism unit 4 define a common ridge 42. Alternatively, the first meandering surface 41a of the curved prism unit 4 and the second meandering surface 41b of the adjacent curved prism unit 4 define a common trough line 43 which is regarded as a common boundary of any two adjacent units of the curved prism units 4.

Referring now to FIGS. 4 and 5, each route of the curved prism units 4 is longitudinally extended in order in a meandering line with respect to the substrate 3, and the curved prism units 4 are juxtaposed on the first surface 31 of the substrate 3. With respect to the first surface 31 of the substrate 3, each of the curved prism units 4 has the same vertical height (H) and horizontal width (W) as well as a constant distance between any two adjacent trough lines 43. The first meandering surface 41a and the second meandering surface 41b of the curved prism unit 4 is longitudinally extended in a meandering line in order to provide changes in curvature even though the routes of the curved prism units 4 are essentially parallel. In use, incident light from the substrate 3 is appropriately guided to the curved prism units 4, and thus the curvature of the first meandering surface 41a and the second meandering surface 41b may refract it in two dimensions. Thereby, the curvature of the first meandering surface 41a and the second meandering surface 41b may relatively enhance the entire refractive efficiency of the brightness enhancement film in two dimensions.

Figure 3:
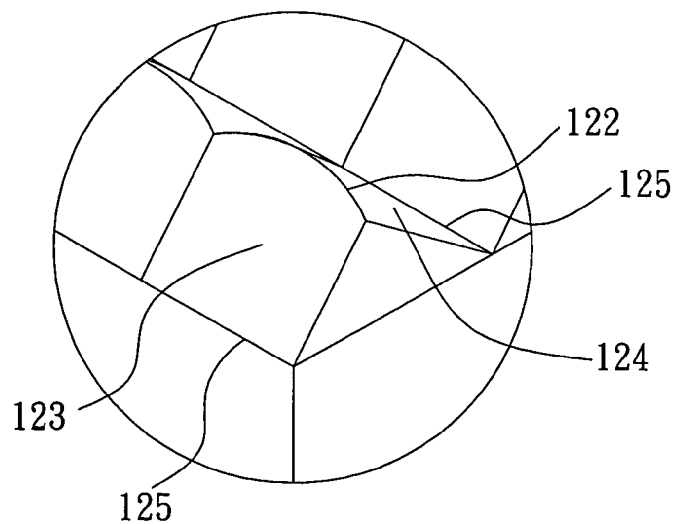
FIG. 3 is an enlarged view in FIG. 2 of U.S. Pat. No. 6,277,471 in accordance with the prior art.

Referring again to FIGS. 4 and 5, the meandering route of the curved prism unit 4 can relatively attenuate the moire phenomenon, thereby increasing the quality of optical display of the brightness enhancement film. In comparison with the brightness units 122 of the conventional film as shown in FIG. 3, the structure of the curved prism units 4 is simplified and thus manufacture cost of the mold assembly is reduced.

Figure 6:
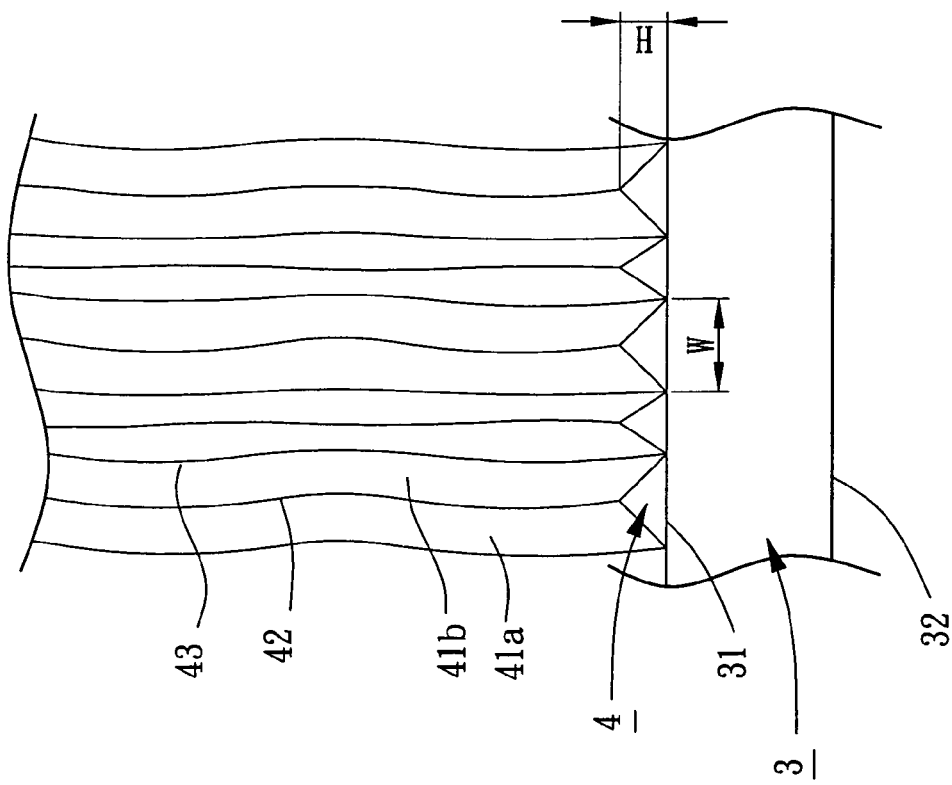
FIG. 6 is a perspective view of a brightness enhancement film having curved prism units in accordance with a second embodiment of the present invention.

Turning now to FIG. 6, reference numerals of the second embodiment of the present invention have applied the identical numerals of the first embodiment. The construction of the brightness enhancement film in accordance with the first embodiment of the present invention has similar configuration and same function as that of the first embodiment and detailed descriptions may be omitted.

Referring to FIG. 6, which illustrates a perspective view, similar to FIG. 4, of a brightness enhancement film having curved prism units in accordance with the second embodiment of the present invention. In comparison with the first embodiment, each of the curved prism units 4 of the second embodiment has the same vertical height (H) and various horizontal widths (W) as well as various distances between any two adjacent trough lines 43. Consequently, the routes of the curved prism units 4 are not parallel and are arranged in haphazard order so that the first meandering surface 41a and the second meandering surface 41b of the curved prism unit 4 are longitudinally extended in a meandering line that provides changes in curvature. In use, the different curvature of any two of the brightness prism units 4 may refract light in two dimensions. Thereby, the curvature of the first meandering surface 41a and the second meandering surface 41b may relatively enhance the entire refractive efficiency of the brightness enhancement film in two dimensions.

Figure 7:
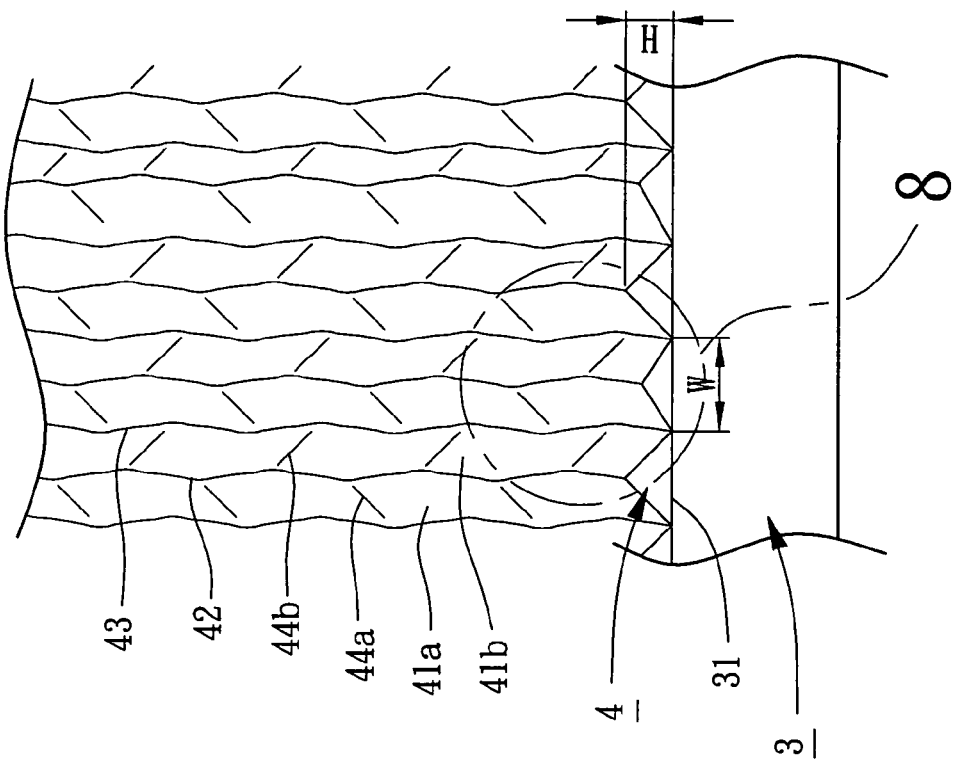
FIG. 7 is a perspective view of a brightness enhancement film having curved prism units in accordance with a third embodiment of the present invention.
Figure 9:
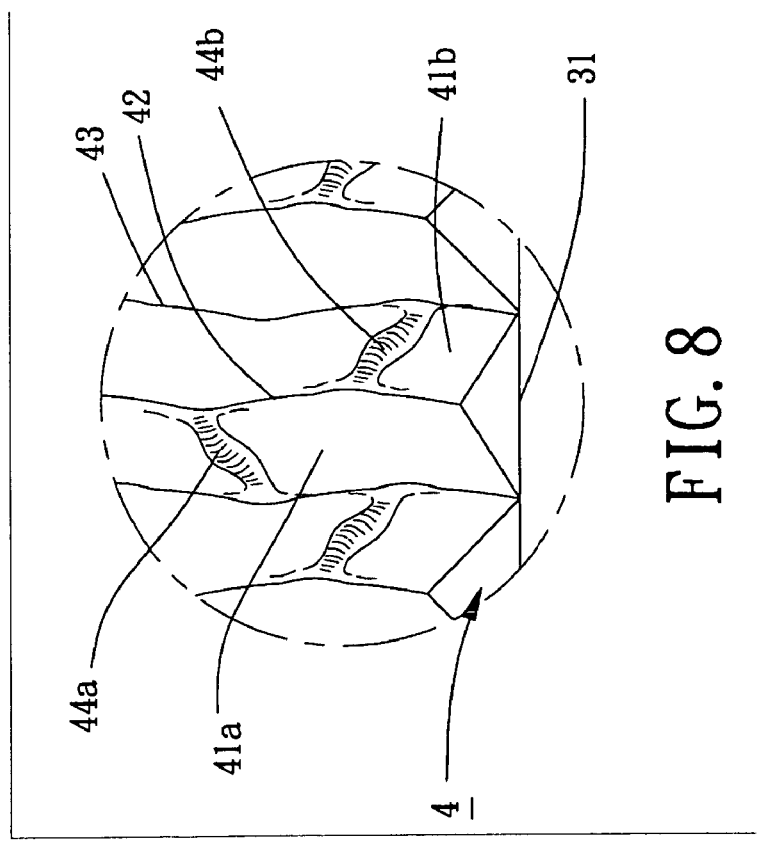
FIG. 9 is an electronic microscopic image of the curved prism units of the brightness enhancement film in accordance with the third embodiment of the present invention.
Figure 8:
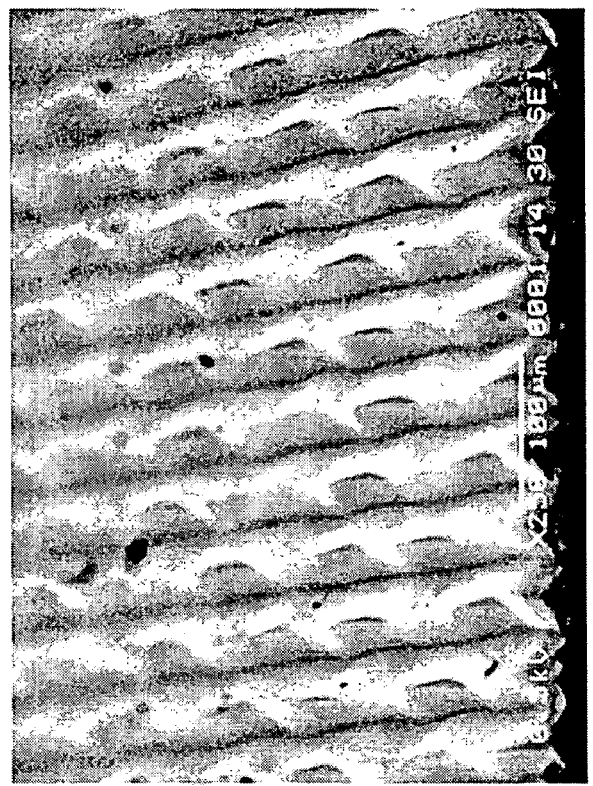
FIG. 8 is an enlarged view in FIG. 7 of the curved prism units of the brightness enhancement film in accordance with the third embodiment of the present invention.

Turning now to FIGS. 7 through 9, reference numerals of the third embodiment of the present invention have applied the identical numerals of the first embodiment. The construction of the brightness enhancement film in accordance with the third embodiment of the present invention has similar configuration and same function as that of the first embodiment and detailed descriptions may be omitted.

Referring to FIGS. 7 through 9, it illustrates a brightness enhancement film having curved prism units in accordance with the third embodiment of the present invention. In comparison with the first embodiment, each of the curved prism units 4 of the third embodiment can be selected from the same vertical height (H) and horizontal width (W) or various vertical heights (H) and horizontal widths (W). Additionally, the first meandering surface 41a and the second meandering surface 41b of the curved prism unit 4 include a plurality of lateral ridges 44a and 44b arranged in staggered manner in a longitudinal direction. Each of the lateral ridges 44a and 44b connects between the common ridge 42 and the common trough line 43 so that the curved prism units 4 are longitudinally extended in a meandering line to provide with changes in curvature. In particular, the curvature of the lateral ridge 44a, 44b adjacent to either of the common ridge 42 or the common trough line 43 is smaller than that of the lateral ridge 44a, 44b beyond both of the common ridge 42 and the common trough line 43. Thereby, the first meandering surface 41a and the second meandering surface 41b accomplish changes in curvature to refract light in two dimensions, and may relatively enhance entire refractive efficiency of the brightness enhancement film in two dimensions. Furthermore, each of the lateral ridges 44a, 44b can be selectively has the same uniform curvature or various curvatures.

Turning now to FIGS. 10 and 11, reference numerals of the fourth embodiment of the present invention have applied the identical numerals of the third embodiment. The construction of the brightness enhancement film in accordance with the fourth embodiment of the present invention has similar configuration and same function as that of the third embodiment and detailed descriptions may be omitted.

Referring to FIGS. 10 and 11, which illustrates a brightness enhancement film having curved prism units in accordance with the fourth embodiment of the present invention. In comparison with the third embodiment, each of the curved prism units 4 of the fourth embodiment consists of a first flat surface 41a' and a second meandering surface 41b adjacent thereto. Meanwhile, the second meandering surface 41b of the curve prism unit 4 includes a plurality of lateral ridges 44b, and the lateral ridges 44b of all of the curve prism units 4 are arranged in staggered manner in a longitudinal direction. Each of the lateral ridges 44b connects between the common ridge 42 and the common trough line 43, and the lateral ridges 44b of the curved prism units 4 are longitudinally extended in a meandering line to provide changes in curvature. In use, incident light from the substrate 3 is appropriately guided to the curved prism units 4, and thus the curvature of the second meandering surface 41b may refract it in two dimensions that may relatively enhance the entire refractive efficiency of the brightness enhancement film in two dimensions. Furthermore, each of the lateral ridges 44b has the same uniform curvature or various curvatures. Each of the curved prism units 4 can be selected from the same vertical height (H) and horizontal width (W) or various vertical heights (H) and horizontal widths (W).

Figure 1:
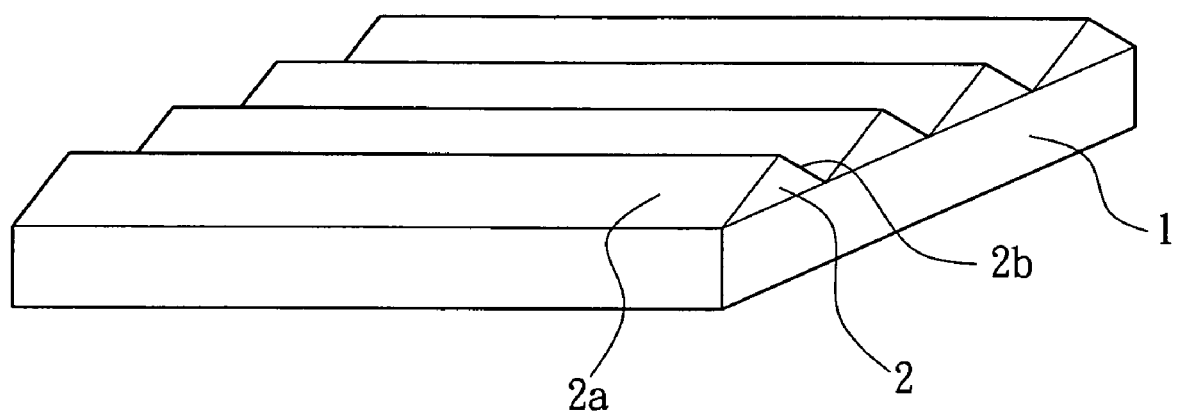
FIG. 1 is a perspective view of International Patent Publication No. WO96/23649 in accordance with the prior art.

Referring back to FIGS. 1 and 4, the curved prism units 4 of the present invention have replaced the first flat facet 2a and the second flat facet 3b of International Patent Publication No. WO 96/23649, and thus the two-dimensional refraction of the brightness enhancement film of the present invention improves the one-dimensional refraction of the brightness enhancement film disclosed in No. WO 96/23649.

Figure 2:
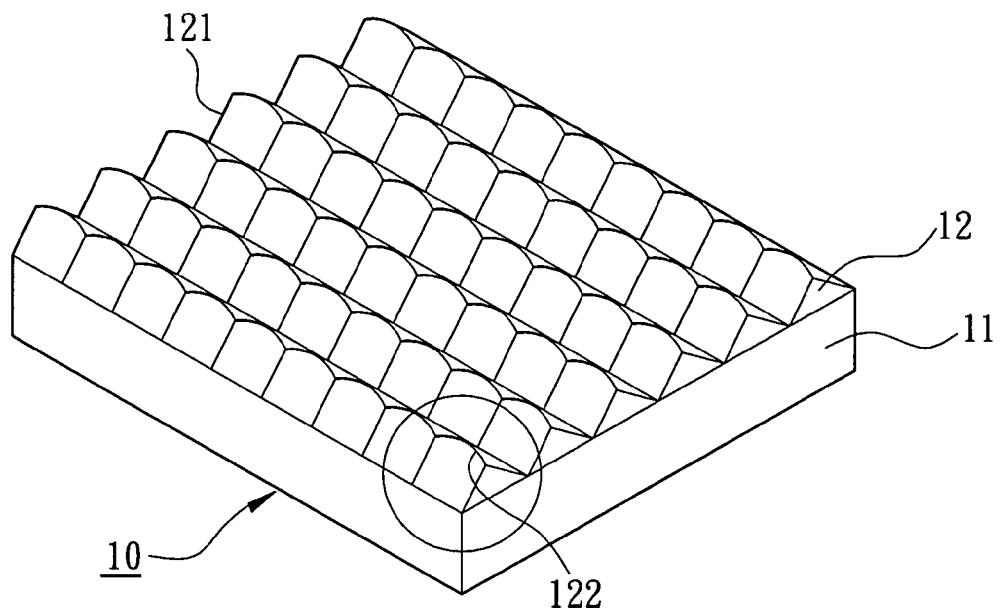
FIG. 2 is a perspective view of U.S. Pat. No. 6,277,471 in accordance with the prior art.

Referring back to FIGS. 2 and 4, the two surfaces 123 and 124 of the brightness unit 122 adjacent to the straight bottom edge 125 disclosed in U.S. Pat. No. 6,277,471 are flat and thus the slope is approximately zero, which may reduce the entire two-dimensional refraction. By contrast, the curved prism units 4 of the present invention provide changes in curvature to refract light in two dimensions to thereby enhance the entire two-dimensional refractive efficiency. Meanwhile, the meandering route of the curved prism unit 4 in haphazard order can relatively attenuate the moire phenomenon, thereby increasing the quality of optical display of the brightness enhancement film.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A brightness enhancement film having curved prism units, said brightness enhancement film being arranged to be used in a liquid crystal display, comprising:
    a substrate including a first surface and a second surface substantially parallel to said first surface, and vertically transmitting light between the first surface and the second surface; and
    a plurality of curved prism units juxtaposed on the first surface of the substrate, each of the curved prism units having a longitudinal direction and including a ridge, a first meandering surface, and a second meandering surface, said first and second meandering surfaces jointly define the ridge and a trough line being defined between any two adjacent curved prism units as a boundary of the adjacent units, said ridge and said meandering surfaces extending and meandering with respect to the longitudinal direction to provide changes in curvature that are able to refract light in two dimensions, wherein directions of said ridge and said meandering surfaces relative to said longitudinal direction vary along a length of each of said prism units,
    wherein each of the first meandering surface and the second meandering surface includes a plurality of lateral ridges arranged in staggered manner in the longitudinal direction to provide changes in curvature, with a curvature of each lateral ridge adjacent to either of the ridge or the trough line being smaller than a curvature of each lateral ridge beyond both of the ridge and the trough line.

2. The brightness enhancement film having the curved prism units as defined in claim 1, wherein each of the curved prism units has the same vertical height with respect to the substrate.

3. The brightness enhancement film having the curved prism units as defined in claim 1, wherein each of the curved prism units has substantially the same horizontal width with respect to the substrate so that each route of the two adjacent curved prism units is longitudinally extended in order in a meandering line with respect to the substrate, and substantially juxtaposed on the first surface of the substrate.

4. The brightness enhancement film having the curved prism units as defined in claim 1, wherein the lateral ridges have the same uniform curvature.

5. The brightness enhancement film having the curved prism units as defined in claim 1, wherein the lateral ridges have various curvatures.

6. The brightness enhancement film having the curved prism units as defined in claim 1, wherein the curved prism units has varying horizontal widths with respect to the substrate so that each route of the two adjacent curved prism units is not parallel and extended in haphazard order in a meandering line with respect to the substrate, and substantially juxtaposed on the first surface of the substrate.

7. The brightness enhancement film having the curved prism units as defined in claim 6, wherein the lateral ridges have the same uniform curvature.

8. The brightness enhancement film having the curved prism units as defined in claim 6, wherein the lateral ridges have various curvatures.

9. The brightness enhancement film having the curved prism units as defined in claim 1, wherein the curved prism unit further includes a flat surface adjacent to the meandering surface.

10. The brightness enhancement film having the curved prism units as defined in claim 9, wherein the meandering surfaces of the curved prism units consist of a plurality of lateral ridges arranged in staggered manner in a longitudinal direction to provide changes in curvature.

11. The brightness enhancement film having the curved prism units as defined in claim 10, wherein the lateral ridges have the same uniform curvature.

12. The brightness enhancement film having the curved prism units as defined in claim 10, wherein the lateral ridges have various curvatures.

13. A brightness enhancement film having curved prism units, said brightness enhancement film being arranged to be used in a liquid crystal display, comprising:
    a substrate including a first surface and a second surface substantially parallel to said first surface, and vertically transmitting light between the first surface and the second surface; and
    a plurality of curved prism units juxtaposed on the first surface of the substrate, each of the curved prism units having a longitudinal direction and including a ridge, a trough line and a meandering surface located between said ridge and said trough line, said ridge and said meandering surface extending and meandering with respect to the longitudinal direction to provide changes in curvature that are able to refract light in two dimensions, wherein directions of said ridge and said meandering surface relative to said longitudinal direction vary along a length of each of said prism units, and wherein the meandering surface includes a plurality of lateral ridges arranged in the longitudinal direction to provide changes in curvature, with a curvature of each lateral ridge adjacent to either of the ridge or the trough line bean smaller than a curvature of each lateral ridge beyond both of the ridge and the trough line.

14. The brightness enhancement film having the curved prism units as defined in claim 13, wherein said lateral ridges extend downwardly from said ridge to said trough line.

15. The brightness enhancement film having the curved prism units as defined in claim 13, wherein the curved prism units include a first meandering surface and a second meandering surface, and thus each of the first meandering surface and the second meandering surface includes a plurality of lateral ridges arranged in staggered manner along the longitudinal direction to provide changes in curvature, said lateral ridges formed on said first meandering surface and said second meandering surface.

16. The brightness enhancement film having the curved prism units as defined in claim 15, wherein said lateral ridges extend downwardly from said ridge to one of said first rough line and said second trough line.

17. A brightness enhancement film having curved prism units, said brightness enhancement film being arranged to be used in a liquid crystal display, comprising:

a substrate including a first surface and a second surface substantially parallel to said first surface, and vertically transmitting light between the first surface and the second surface;

a plurality of curved prism units juxtaposed on the first surface of the substrate, each of the curved prism units having a longitudinal direction and including a ridge, two trough lines and at least one meandering surface located between said ridge and one of said trough lines, said ridge and said meandering surface extending and meandering with respect to the longitudinal direction to provide changes in curvature that are able to refract light in two dimensions, wherein directions of said ridge and said meandering surface relative to said longitudinal direction vary along a length of each of said prism units, and wherein said trough lines define a horizontal width therebetween, each of the curved prism units substantially having the same horizontal width with respect to the substrate so that each route of the two adjacent curved prism units is longitudinally extended in order in a meandering line with respect to the substrate, wherein the meandering surface includes a plurality of lateral ridges arranged in staggered manner in the longitudinal direction to provide changes in curvature, with a curvature of each lateral ridge adjacent to either of the ridge or the trough line being smaller than a curvature of each lateral ridge beyond both of the ridge and the trough line.

18. A brightness enhancement film having curved prism units, said brightness enhancement film being arranged to be used in a liquid crystal display, comprising:

a substrate including a first surface and a second surface substantially parallel to said first surface, and vertically transmitting light between the first surface and the second surface;

a plurality of curved prism units juxtaposed on the first surface of the substrate, each of the curved prism units having a longitudinal direction and including a ridge, two trough lines and at least one meandering surface located between said ridge and one of said trough line, said ridge and said meandering surface extending and meandering with respect to the longitudinal direction to provide changes in curvature that are able to refract light in two dimensions, wherein directions of said ridge and said meandering surface relative to said longitudinal direction vary along a length of each of said prism units, and wherein said trough lines define a horizontal width therebetween, each of the curved prism units varying in horizontal widths with respect to the substrate, wherein the meandering surface includes a plurality of lateral ridges arranged in staggered manner in the longitudinal direction to provide changes in curvature, with a curvature of each lateral ridge adjacent to either of the ridge or the trough line being smaller than a curvature of each lateral ridge beyond both of the ridge and the trough line.

* * * * *